United States Patent [19]

Patterson

[11] Patent Number: 5,618,394
[45] Date of Patent: Apr. 8, 1997

[54] SYSTEM AND ELECTROLYTIC CELL HAVING INERT SPHERICAL CORE CATALYTIC ELEMENTS FOR HEATING A LIQUID ELECTROLYTE

[76] Inventor: James A. Patterson, 2074 20th St., Sarasota, Fla. 34234

[21] Appl. No.: 586,164

[22] Filed: Jan. 16, 1996

[51] Int. Cl.⁶ .............................. C25B 9/00; C25B 11/08; C25B 11/02
[52] U.S. Cl. ..................... 204/275; 204/284; 204/290 R
[58] Field of Search ................................. 204/222, 275, 204/284, 290 R

[56] References Cited

U.S. PATENT DOCUMENTS

| | | | |
|---|---|---|---|
| 2,915,406 | 12/1959 | Rhoda et al. | 106/1.28 X |
| 3,632,496 | 1/1972 | Patterson | 204/275 X |
| 3,888,756 | 6/1975 | Teshima et al. | 204/275 |
| 4,269,689 | 5/1981 | Agladze | 204/222 X |
| 4,316,786 | 2/1982 | Yu et al. | 204/275 X |
| 4,913,779 | 4/1990 | Lacoste | 204/222 X |
| 4,943,355 | 7/1990 | Patterson | 205/151 |
| 5,036,031 | 7/1991 | Patterson | 502/10 |
| 5,318,675 | 6/1994 | Patterson | 205/628 |
| 5,372,688 | 12/1994 | Patterson | 204/222 |

*Primary Examiner*—Donald R. Valentine
*Attorney, Agent, or Firm*—Charles J. Prescott

[57] ABSTRACT

An electrolytic system and cell for heating water containing a conductive salt in solution. The electrolytic cell includes a non-conductive housing having an inlet and an outlet and spaced apart first and second conductive foraminous grids positioned within the housing. A plurality of conductive microspheres each formed of inert spherical cores and having a uniform conductive metallic surface which is readily combineable with hydrogen or an isotope of hydrogen to form a metallic hydride are positioned within the housing in electrical contact with the first grid adjacent the inlet. An electric power source in the system is operably connected across the first and second grids whereby electrical current flows between the grids within the water solution.

16 Claims, 1 Drawing Sheet

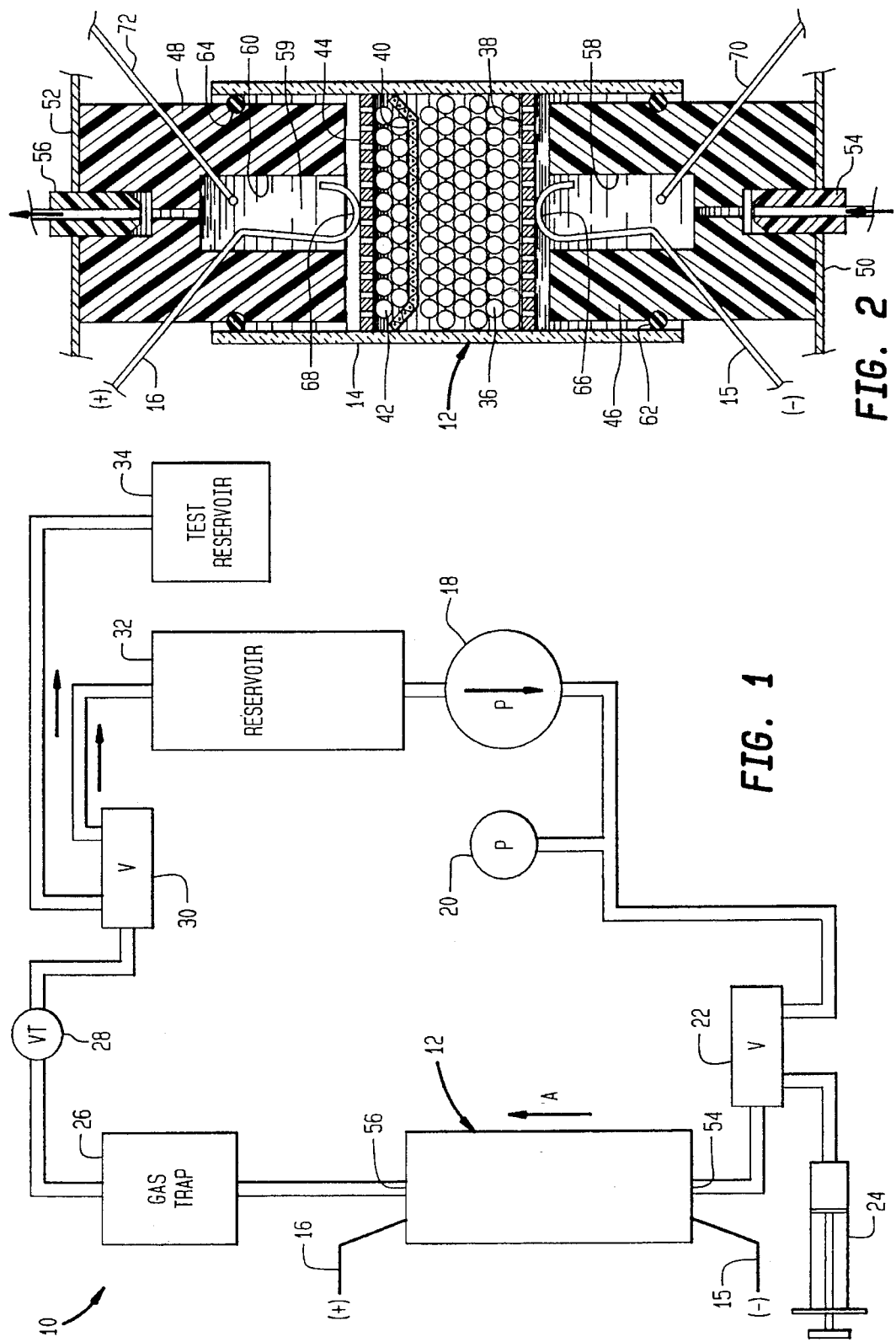

SYSTEM AND ELECTROLYTIC CELL HAVING INERT SPHERICAL CORE CATALYTIC ELEMENTS FOR HEATING A LIQUID ELECTROLYTE

BACKGROUND OF THE INVENTION

1. Scope of Invention

This invention generally relates to electrolytic cells, and more particularly to an improved electrolytic cell for electrolysis of water and the production of heat.

2. Prior Art

The present invention utilizes and improves upon microspheres formed of non-metallic beads which are plated with a uniformly thick coating of palladium. These palladium coated microspheres are taught in my previous U.S. Pat. Nos. 4,943,355 and 5,036,031. In these above-recited previous patents, cross linked polymer microspheres forming an inner core and having a plating of palladium thereatop are taught to exhibit improvements in the absorption of hydrogen and isotopes of hydrogen. Utilizing these catalytic microspheres led to my later U.S. Pat. Nos. 5,318,675 ('675) and 5,372,688 ('688) (incorporated herein by reference) which teach an electrolytic cell, system and method for, inter alia, producing heat.

The use of a palladium sheet to form one electrode within an electrolytic cell to produce excess heat, the electrolytic cell being a Pons-Fleischmann-type, is taught by Edmund Storms. The description of the Storms electrolytic cell and his experimental performance results are described in an article entitled *Measurements of Excess Heat from a Pons-Fleischmann-Type Electrolytic Cell Using Palladium Sheet* appearing in Fusion Technology, Volume 3, March 1993. In a previous article, Storms reviewed experimental observations about electrolytic cells for producing heat in an article entitled *Review of Experimental Observations About the Cold Fusion Effect* in FUSION TECHNOLOGY, Vol. 20, Decemember 1991.

None of the previously reported experimental results or other prior art devices known to applicant other than my U.S. '675 and '688 patents have utilized or disclosed non-conductive copolymeric beads of palladium coated (or any substitute metal which will form "metallic hydrides" in the presence of hydrogen) conductive microspheres within an electrolytic cell for the production of heat and the electrolysis of water into its hydrogen and oxygen components. The present invention discloses various improved embodiments of preferably palladium coated microspheres having inert spherical cores utilized within an electrolytic cell and system in conjunction with an electrolytic media containing either water or heavy water, particularly deuterium. By the use of inert spherical cores which do not interact with the liquid electrolyte to produce heat, the scope of my previous '675 and '688 patents are, as here disclosed and claimed, substantially broadened.

BRIEF SUMMARY OF THE INVENTION

This invention is directed to an electrolytic system and cell for heating water containing a conductive salt in solution. The electrolytic cell includes a non-conductive housing having an inlet and an outlet and spaced apart first and second conductive foraminous grids positioned within the housing. A plurality of conductive microspheres each formed of inert spherical cores and having a uniform conductive metallic surface which is readily combineable with hydrogen or an isotope of hydrogen to form a metallic hydride are positioned within the housing in electrical contact with the first grid adjacent the inlet. An electric power source in the system is operably connected across the first and second grids whereby electrical current flows between the grids within the water solution.

It is therefore an object of this invention to utilize preferably palladium coated microspheres as previously disclosed in my '675 and '688 patents in combination with inert spherical cores which themselves do not interact to produce heat for the production of either hydrogen and oxygen and/or heat for use.

It is yet another object of this invention to provide an improved electrolytic cell for the increased production of heat in the form of heated water or heavy water-based liquid electrolyte flowing from the cell.

It is yet another object of this invention to utilize metal coated conductive microspheres having inert spherical cores in an electrolytic cell, the metal chosen from one of those which exhibit strong hydrogen absorption properties to form "metallic hydrides".

In accordance with these and other objects which will become apparent hereinafter, the instant invention will now be described with reference to the accompanying drawings.

BRIEF DESCRIPTION OF THE DRAWINGS

FIG. 1 is a schematic view of an experimental system embodying the present invention.

FIG. 2 is a section view of the electrolytic cell shown in FIG. 1.

DETAILED DESCRIPTION OF THE INVENTION

My prior U.S. Pat. Nos. 5,318,675 (U.S. '675) and 5,372,688 (U.S. '688) and the teachings contained therein are hereby incorporated by reference.

Referring now to the drawings, a system embodying concepts of the invention utilized during testing procedures is shown generally at numeral 10. This system 10 includes an electrolytic cell shown generally at numeral 12 interconnected at each end with a closed loop electrolyte circulation system. The circulation system includes a pump 18 which draws a liquid electrolyte 59 from a reservoir 32 and forces the electrolyte 59 in the direction of the arrow into inlet 54 of electrolytic cell 12. This pump 18 is a constant volume pump. After the electrolytic cell 12 is completely filled with the electrolyte 59, the fluid then exits an outlet 56, then flowing into a gas trap 26 which is provided to separate hydrogen and oxygen gas from the electrolyte 59 when required. A throttle valve 28 downstream of the gas trap 26 regulate the electrolyte flow so as to also regulate the fluid pressure within the electrolytic cell 12 as monitored by pressure gauge 20.

A slide valve 22 provides for the intermittent introduction of ingredients into the liquid electrolyte 59 via syringe 24. A second slide valve 30 provides for the periodic removal of electrolyte 59 into test reservoir 34 for analysis to determine correct electrolyte make-up.

In FIG. 2, the details of the electrolytic cell 12 utilized during testing procedures is there shown. A cylindrical glass non-conductive housing 14, open at each end, includes a moveable non-conductive end member 46 and 48 at each end thereof. These end members 46 and 48 are sealed within the housing 14 by O-rings 62 and 64. The relative spacing between these end members 46 and 48 is controlled by the movement of end plates 50 and 52 thereagainst.

Each of the end members 46 and 48 includes an inlet stopper 54 and an outlet stopper 56, respectively. Each of these stoppers 54 and 56 define an inlet and an outlet passage, respectively into and out of the interior volume, respectively, of the electrolytic cell 12. These end members 46 and 48 also include a fluid chamber 58 and 60, respectively within which are mounted electrodes 15 and 16, respectively, which extend from these chambers 58 and 60 to the exterior of the electrolytic cell 12 for interconnection to a d.c. power supply (not shown) having its negative and positive terminals connected as shown. This d.c. power supply is a constant current type. Also positioned within the chambers 58 and 60 are thermocouples 70 and 72 for monitoring the electrolyte temperature at these points of inlet and outlet of the electrolytic cell 12. However, in the experiments reported herebelow, the inlet temperature of the liquid electrolyte was measured outside of the cell 12 immediately upstream of stopper 54 to more accurately reflect temperature differential ($\Delta T$).

A plurality of conductive microspheres 36 are positioned within housing 14 immediately adjacent and against a conductive foraminous grid 38 formed of platinum and positioned transversely across the housing 14 as shown. These conductive microspheres 36 are formed of non-conductive inert cores described herebelow and include a uniform palladium plating layer. The preferred size of these conductive microspheres are in the range of 1.0 mm or less in diameter.

An in-line heater (not shown) may be disposed between the pressure gauge 20 and the slide valve 22. This heater is provided to heat the electrolyte liquid as it flows through the system 10 and the cell 12. Note importantly that the heater may be positioned anywhere in the closed system electrolyte flow path as the heating applied is of a steady state nature as a pre-heating condition of the electrolyte, although positioning of the heater 21 is preferred to be adjacent the inlet 54 of the cell 12 for better liquid electrolyte temperature control. The heating of the electrolyte external to the cell 12 is one means for triggering the catalytic reaction within the cell 12 to initially produce and/or enhance a positive temperature differential ($\Delta T$) of the electrolyte as it flows through the cell 12. Another means for triggering this heat production reaction between the electrolyte and the beads or particles 36 is by the application of sufficient electric d.c. current across electrodes 15 and 16 described herebelow.

Referring to FIG. 2, a non-conducive foraminous nylon mesh 40 is positioned against the other end of these conductive microspheres 36 so as to retain them in the position shown. Adjacent the opposite surface of this non-conductive mesh 40 is a plurality of non-conductive spherical microbeads 42 formed of cross-linked polystyrene and having a uniform diameter of about 1.0 mm. Against the other surface of this layer of non-conductive microbeads 42 is a conductive foraminous grid 44 positioned transversely across the housing 14 as shown.

Should the system 10 boil off or otherwise inadvertently lose all liquid electrolyte within the cell 12, a means of preventing system shut-down is preferred which replaces the non-conductive microspheres 42 with non-metallic spherical cation ion exchange polymer conductive microbeads preferably made of cross-linked styrene divinyl benzene which have fully pre-sulfonated surfaces which have been ion exchanged with a lithium salt. This preferred non-metallic conductive microbead structure will thus form a "salt bridge" between the anode 44 and the conductive microspheres 36, the non-conductive mesh 40 having apertures sufficiently large to permit contact between the conductive microspheres 36 and the conductive non-metallic microbeads. The mesh size of mesh 40 is 200–500 micrometers. This preferred embodiment also prevents melting of the replaced non-conductive microbeads 42 while reducing cell resistance during high loading and normal operation.

The end of the electrode 15 is in electrical contact at 66 with conductive grid 38, while electrode 16 is in electrical contact at 68 with conductive grid 44 as shown. By this arrangement, when there is no electrolyte within the electrolytic cell 12, no current will flow between the electrodes 15 and 16.

ELECTROLYTE

When the electrolytic cell 12 is filled with a liquid electrolyte 59, current will flow between the electrodes 15 and 16. The preferred formulation for this electrolyte 59 is generally that of a conductive salt in solution with water. The preferred embodiment of water is that of either light water ($H_2^1O$) or heavy water and more specifically that of deuterium ($H_2^2O$). The purity of all of the electrolyte components is of utmost importance. The water ($H_2^1O$) and the deuterium ($H_2^2O$) must have a minimum resistance of one megohm with a turbidity of less than 0.2 n.t.u. This turbidity is controlled by ultra membrane filtration. The preferred salt solution is lithium sulfate ($Li_2SO_4$) in a 2-molar mixture with water and is of chemically pure quality. In general, although a lithium sulfate is preferred, other conductive salts chosen from the group containing boron, aluminum, gallium, and thallium, as well as lithium, may be utilized. The preferred pH or acidity of the electrolyte is 9.0.

CONDUCTIVE BEADS

Palladium coated microspheres were originally preferred as disclosed in U.S. Pat. Nos. '675 and '688 and as taught in my U.S. Pat. Nos. 4,943,355 and 5,036,031. Moreover, palladium may be substituted by other transition metals, rare earths and also uranium. In general, any of these metals which are capable of combining with high volumes of hydrogen to form "metallic hydrides" are acceptable. These metals known to applicant which will serve as a substitute for palladium are lanthanum, praseodymium, cerium, titanium, zirconlure, vanadium, tantalum, uranium, hafnium and thorium.. Authority for the inclusion of these elements within this group is found in a book entitled *"Inorganic Hydrides,* by B. L. Shaw, published by Pergammon Press, 1967. However, palladium is the best known and most widely studied metallic hydride and was utilized in my previously referenced patents to form conductive hydrogen-absorbing microspheres.

Other recent research by R. Mills in an article entitled *Excess Heat Production by the Electrolysis of Inequious Potassium Carbonate Electrolyte and the Implications for "Cold Fusion"* published in Fusion Technology 20 dated (1991) 65, suggests that nickel should be added to this category of metallic hydride or deuteride forming metals for production of heat using an $H_2O$-based electrolyte. Support for the inclusion of nickel may also be drawn from my previous co-pending application Ser. No. 08/566,547, filed Dec. 4, 1995 in which a thin layer of nickel was deposited atop a uniform palladium layer plated around a spherical core. The nickel was presumed to add structural integrity only, but it is now believed that nickel will interact with a water-based electrolyte to produce useful amounts of heat as well.

In an even more general sense, the broad requirement here is to provide a "metallic hydride" surface, the makeup of the core of the microspheres being a secondary consideration so long as the core is spherical and "inert". In my previously referenced patents and inventive work with respect to metallic hydride forming coated microspheres, only cores formed of styrene divinyl benzine having a sulfonated surface had been utilized. However, experimental results leading to the present invention utilize a sufficiently broad range of core materials and surface finishes to lead to the conclusion that any spherical core which possesses the general characteristics of being "inert" may be utilized in conjunction with one or more of the combinations of metallic hydride forming coating materials applied thereatop.

Experimental results reported herebelow utilize a broad array of inert materials including glass, ceramic, steel and silver. The important general material feature which appears to be in common with these cores proven to be successful is the inertness of the material or its lack of interaction with the electrolyte within the cell to produce heat. That function of producing excess heat is left entirely to the metallic hydride forming layer or layers applied atop the inert spherical core.

GLASS CORE

Solid glass spherical cores were prepared having a 0.9 mm diameter. Two techniques for applying the active layers of palladium and, where desired, other metals capable of forming a metallic hydride have been employed. Previously reported in my earlier patents, very thin layers have been applied atop a styrene divinyl benzene spherical core by techniques of electroless plating such as that disclosed in U.S. Pat. No. 2,915,406 by R. N. Rhoda, et al. Layer thicknesses by this plating technique are typically in the range of about at least 1.0 micron in thickness. An alternate technique for applying layers atop the glass core was utilized, however, that application technique being via sputtering in order to obtain a uniform layer of metallic hydride forming material.

Although the technique of sputtering layers of metal atop an object is well known, to obtain a uniform layer atop small spherical beads, the University of Illinois was requested to develop and utilize an improvement in sputtering wherein a sputtering chamber was utilized in conjunction with a vibrating basket. This modified sputtering technique is reported in detail in the attached paper entitled "Metallic Thin-Film Sputtering on Small (sic) Polyester Spheres" by Michael Williams, Dec. 5, 1995 (unpublished), copy attached.

As disclosed in my '355 and '688 patents, cells utilizing the microsphere beads having an exterior palladium layer atop the new spherical inert core disclosed herein generally represent the broadest scope of this aspect of the present invention. However, the glass beads utilized in this experiment as plated by the University of Illinois included a first sputtered layer of nickel having a thickness of 0.1 micron, a second sputtered layer of palladium having a thickness of 0.1 micron and a third sputtered layer of nickel having a thickness of 0.1 micron. The additional layers of nickel beneath and atop the palladium plating as reported in my co-pending application Ser. No. 08/462,005, filed Jun. 5, 1995 disclose this improved layer arrangement.

It is noted that the typical minimum thickness of each layer of 1.0 microns as previously described with respect to electroless nickel plating is much greater than the layer of thickness obtained with respect to the University of Illinois sputtering technique on glass beads. Although there is substantial material cost benefit to this significantly decreased layer thickness of palladium, extensive equipment expenditure to achieve the sputtering of palladium on a commercial basis utilizing a vibrating basket as described in the attached paper by Michael Williams would likely only be incurred on a large production basis.

CERAMIC CORE

The experimental results reported herebelow with respect to ceramics utilized a spherical ceramic core 1.0 mm in diameter coated by electroless plating with a first layer of palladium having a thickness of approximately 2 microns followed by a second layer of nickel having a thickness of 0.5 microns. Again, the nickel outer layer was applied primarily for improved structural integrity of the palladium layer as it is heat stressed during its duty cycle.

Because ceramic spheres of this size were not commercially available, I developed a manufacturing technique wherein small ceramic cylinders having a diameter and length of approximately 1.5 mm were prepared by forcing or extruding standard potter's clay through a mold at about 150° C., the resulting cylinders being cured at 550° C. These cured cylinders were then ground into spheres using a standard ball milling process. The required time for ball milling is somewhat proportional to the cure temperature of the ceramics. At a cure temperature of 550° C., the time for ball milling required is approximately one hour; a cure temperature of 950° C. would require in the range of twelve hours of ball milling to produce the desired 1 mm spherical ceramic core.

The ceramic spheres prepared in this way were first plated by electroless nickel with a very thin flash layer of palladium, after which a 2 micron layer of palladium was deposited thereatop, followed by the 0.5 micron thickness layer of nickel. Layer thicknesses were confirmed, as with all of the conductive microspheres tested, by measuring the resistivity of each layer which averaged about 0.95 Ohms for each particle.

NYLON CORE

Although no experiments were performed directly using nylon cores as a basis of producing the conducted microspheres within the electrolytic cell described, a single nylon sphere of approximately 10 mm in diameter was coated with one layer of palladium having a thickness of approximately 3 microns, followed by a layer of nickel of approximately 1 micron thickness.

The procedure for preparing the nylon spherical core prior to palladium plating involve the following steps:

a. rinse for 30 min. in 5% $NH_3OH$ b. rinse with w/deionized $H_2O$ c. add $PdCl_2$ raising temp. to 45° C.

d. add 2 drops $H_2$ changing the solution color to black e. rinse with w/deionized $H_2O$

STEEL SHOT CORE

Cores of steel were made from steel shot having a diameter of about 2.0 mm which were electroless coated with a layer of palladium having a thickness of approximately 1.5 microns followed by a layer of nickel having a thickness of approximately 2.0 microns. The palladium layer was applied in accordance with the process described in U.S. Pat. No. 2,915,406, while the nickel plating was applied by electroless plating techniques.

SILVER CORE

A spherical silver core having a diameter of approximately 0.9 mm was first plated with nickel having a thickness of approximately 2.0 microns, followed by a palladium layer having a thickness of 1.5 microns, followed by a second outer nickel plating of approximately 0.6 microns.

CELL RESISTANCE

In preparing the electrolytic cells for testing, the cell resistance was measured utilizing a Whetstone Bridge or an Ohm meter prior to the introduction of the electrolyte into the electrolytic cell. This cell resistance, when dry, should be infinitely high. Otherwise, a short between the anode screen and the cathode beads exists and the unit would have to be repacked. Prior to testing, with electrolyte present, the cell resistance was set at 16 ohms by appropriate compression of the end members.

RELATIVE SURFACE AREAS

The range in diameters of the conductive microspheres as above described is relatively broad, limited primarily by the ability to plate the inert cores and the economic factors involved therein. As a guideline, however, it has been determined that there exists a preferred range in the ratio between the total surface area of all of the conductive microspheres collectively within the electrolytic cell 12 and the inner surface area of the non-conductive housing, e.g. 14 in FIG. 2, which surrounds the bed of conductive microspheres. As in FIG. 2, this housing inner surface area would extend from the conductive foraminous grid 38 and the non-conductive mesh 40.

A minimum preferred ratio of the total bead surface area to the inner housing surface area is in the range of 5 to 1 (5:1). However, an ideal area ratio is 10 to 1 (10:1) and is typically utilized in the experiments reported herebelow. This ratio is thus affected primarily by the diameter of the conductive microspheres, the smaller the diameter of the microspheres, the higher the ratio becomes.

EXPERIMENTAL RESULTS

The testing procedures incorporated two stages. The first stage may be viewed as a loading stage during which a relatively low level current (0.05 amps) is introduced across the conductive members, that current facilitated by the presence of the electrolyte as previously described.

LOADING

During the initial loading, electrolysis of the water within the liquid electrolyte occurs so that the hydrogen active surface of the conductive particles fully absorbs and combines with hydrogen, i.e. becomes "loaded". This loading takes about two hours under a current flow through the cell of about 0.05 amps per two (2) cm$^3$ of particle volume. As the particles load with hydrogen, the resistance of the cell will be seen to increase. The cell's resistance measured at constant temperature should be seen to rise about 10%. It is recommended that the loading should proceed at least until the resistance is no longer increasing. As loading proceeds further, a decrease in resistance will appear.

TEST RUN

After hydrogen and/or hydrogen isotope, loading of the hydrogen active material of the conductive particles, the current level between conductive members is then incrementally increased, during which time the electrolyte temperature differential is monitored. The temperature of the electrolyte circulating within the electrolytic cell 12 was fully monitored, along with temperature differential and flow rate of the heat exchange liquid.

Experimental test procedures and results and graphic display of those results form my previous U.S. Pat. No. '674 and '688 are repeated by reference thereto. Similar tests with respect to the new inert core conductive microspheres were conducted which showed substantially above 100% heat outputs (yields), also referred to as "excess heat". Excess heat is more generally defined herein as the ratio (greater than 1.0) of heat energy output to electrical power input.

Table I herebelow represents a tabularization of actual test results performed on an electrolytic cell as shown in FIG. 2 using the above-described nickel/palladium/nickel coated glass core microspheres as at 36 of FIG. 2. In general, the tabular results herebelow all represent data taken in terms of elapsed time in minutes, change in temperature of the electrolyte between the inlet 54 and the outlet 56 of the cell 12 ($\Delta T°$ C.), current flow in amps, voltage (V) across the electrolytic cell 12 between terminals 15 and 16, the flow rate of the electrolyte (ml/min) and calculated watts in and watts out and percent yield. Percentage yield, in terms of useful heat energy imparted into the liquid electrolyte as it passes through the cell 12, is defined as the wattage output derived from heat energy in the electrolyte divided by the wattage input derived from electric current input times 100%. In calculating watts in, the input voltage is reduced by 1.5 volts which represents the known voltage loss in electrolysizing H$_2$O, which energy is returned to the system in the recombination of H$_2$O. Calculation of watts (out) is made by relationship: Watts (out)=flow rate×$\Delta T$×70, where flow rate is in terms of liters per minute and $\Delta T$ is in °C.

TABLE I

| Time (min) | $\Delta T$ °C. (To-Tin) | T(in)°C. | Amps (A) | Volts (V) | V-1.5 | Flow Rate ml/min | Watts in | Watts out | % Yield |
|---|---|---|---|---|---|---|---|---|---|
| 0 | .3 | 21.7 | .02 | 2.75 | 1.25 | 16.7 | .025 | .349 | 1396. |
| 14 | .3 | 21.4 | .02 | 4.84 | 3.34 | 17.6 | .066 | .369 | 557. |
| 38 | .4 | 21.6 | .02 | 5.11 | 4.61 | 16.7 | .09 | .465 | 517. |
| 54 | .4 | 21.5 | .02 | 4.83 | 3.33 | 16.7 | .066 | .465 | 699. |
| 69 | .5 | 21.5 | .02 | 4.69 | 3.19 | 17.6 | .06 | .613 | 1022. |
| 82 | .3 | 21.7 | .02 | 4.51 | 3.01 | 17.6 | .06 | .367 | 611. |
|  | 6.9 | 32.2 | .02 | 3.99 | 2.49 | 16.7 | .049 | 8.02 | 16383. |
|  | 10.6 | 42.0 | .02 | 3.50 | 2.00 | 16.7 | .04 | 12.33 | 30831. |

Table II herebelow represents the tabularization of actual test results utilizing the above-described nickel/palladium/nickel coated ceramic core microspheres. A salt bridge was utilized within the cell as previously described.

TABLE II

| Time (min) | Δ T °C. (To-Tin) | T(in)°C. | Amps (A) | Volts (V) | V-1.5 | Flow Rate ml/min | Watts in | Watts out | % Yield |
|---|---|---|---|---|---|---|---|---|---|
| 0 | .1 | 18.4 | .02 | 3.06 | 1.56 | 17.6 | .03 | .123 | 411. |
| 4 | .1 | 18.4 | .02 | 3.35 | 1.85 | 17.6 | .037 | .123 | 333. |
| 8 | .2 | 18.5 | .02 | 3.70 | 2.20 | 17.6 | .04 | .246 | 616. |
| 16 | .2 | 18.2 | .02 | 3.69 | 2.19 | 16.7 | .04 | .233 | 585. |
| 24 | .6 | 18.7 | .02 | 3.65 | 2.15 | 16.7 | .04 | .701 | 1754. |
| 36 | .7 | 19.0 | .02 | 3.64 | 2.14 | 16.7 | .04 | .818 | 2046. |
| 46 | .9 | 19.0 | .02 | 3.59 | 2.09 | 17.6 | .04 | 1.108 | 2772. |
| 52 | .8 | 19.3 | .02 | 3.57 | 2.07 | 16.7 | .04 | .935 | 2338. |
| 64 | 6.0 | 31.6 | .02 | 3.36 | 1.86 | 16.7 | .037 | 7.01 | 18957. |
| 74 | 7.5 | 34.0 | .02 | 3.30 | 1.80 | 17.6 | .036 | 9.24 | 25667. |
| 88 | 9.0 | 36.0 | .02 | 3.27 | 1.77 | 17.6 | .035 | 11.08 | 31680. |
| 102 | 9.8 | 36.5 | .02 | 3.24 | 1.74 | 17.6 | .03 | 12.07 | 40245. |
| 114 | 11.6 | 37.1 | .02 | 3.16 | 1.66 | 16.7 | .03 | 13.56 | 45201. |

Table III herebelow represents a tabularization of actual test results performed on the electrolytic cell shown in FIG. 2 utilizing the above-described nickel/palladium/nickel coated steel shot core microspheres.

TABLE III

| Time (min) | Δ T °C. (To-Tin) | T(in)°C. | Amps (A) | Volts (V) | V-1.5 | Flow Rate ml/min | Watts in | Watts out | % Yield |
|---|---|---|---|---|---|---|---|---|---|
| 0 | .4 | 23.7 | .02 | 4.20 | 2.70 | 16.7 | .05 | .467 | 935. |
| 4 | .5 | 23.7 | .02 | 6.22 | 4.72 | 16.7 | .09 | .584 | 649. |
| 10 | .6 | 23.9 | .02 | 5.82 | 4.32 | 15.7 | .086 | .659 | 767. |
| 14 | .6 | 23.9 | .02 | 5.93 | 4.43 | 16.7 | .088 | .701 | 799. |
| 20 | .7 | 24.0 | .02 | 5.65 | 4.15 | 15.7 | .08 | .769 | 962. |
| 40 | .8 | 24.4 | .02 | 5.55 | 4.05 | 15.7 | .08 | .879 | 1099. |
| 52 | .5 | 24.6 | .02 | 5.49 | 3.99 | 16.7 | .079 | .584 | 740. |
| 62 | .8 | 24.5 | .02 | 5.25 | 3.75 | 16.7 | .075 | .935 | 1247. |
| 84 | 8.8 | 40.5 | .015 | 4.58 | 3.08 | 16.7 | .04 | 10.28 | 22251. |
| 96 | 9.0 | 43.2 | .015 | 4.38 | 2.88 | 16.7 | .04 | 10.52 | 24354. |
| 110 | 10.4 | 43.2 | .01 | 4.20 | 2.70 | 15.7 | .027 | 11.43 | 42333. |

Table IV herebelow represents a tabularization of actual test results performed on the electrolytic cell shown in FIG. 2 utilizing the above-described nickel/palladium/nickel coated silver core microspheres.

TABLE IV

| Time (min) | Δ T °C. (To-Tin) | T(in)°C. | Amps (A) | Volts (V) | V-1.5 | Flow Rate ml/min | Watts in | Watts out | % Yield |
|---|---|---|---|---|---|---|---|---|---|
| 40 | 1.3 | 26.0 | .02 | 3.78 | 2.28 | 16.7 | .045 | 1.51 | 3317. |
| 60 | 1.2 | 26.3 | .02 | 3.90 | 2.40 | 15.8 | .048 | 1.32 | 2752. |
| 76 | 1.2 | 26.0 | .02 | 3.56 | 2.06 | 17.6 | .041 | 1.47 | 3571. |
| 86 | 1.1 | 26.0 | .02 | 3.51 | 2.01 | 16.7 | .040 | 1.279 | 3184. |
| 98 | 1.5 | 26.0 | .01 | 3.30 | 1.80 | 16.7 | .018 | 1.745 | 9695. |
| 106 | 1.5 | 25.5 | .01 | 3.27 | 1.77 | 16.7 | .0177 | 1.745 | 9859. |
| 112 | 2.0 | 25.6 | .01 | 3.257 | 1.75 | 15.8 | .0175 | 2.2 | 12571. |
| 144 | 2.7 | 29.0 | .01 | 3.18 | 1.68 | 16.7 | .0168 | 3.14 | 18698. |
| 202 | 3.8 | 35.5 | .01 | 3.08 | 1.58 | 17.6 | .0158 | 4.659 | 29489. |
| 312 | 8.0 | 49.5 | .10 | 6.50 | 5.00 | 16.7 | .5 | 9.307 | 1862. |

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. An electrolytic cell for producing excess heating of a liquid electrolyte for use external to said cell comprising:

a non-conductive housing having an inlet and an outlet;

a first conductive foraminous grid positioned within said housing adjacent to said inlet;

a second conductive foraminous grid positioned within said housing spaced from said first conductive grid and adjacent to said outlet;

a plurality of conductive microspheres each having an inert spherical core taken from the group consisting of steel, silver, plastic and ceramic each said spherical core completely covered with a uniformly thick outer conductive metallic layer formed over said inert core, said metallic layer, during operation of said cell, being adapted to combine with hydrogen or an isotope of hydrogen to form a metallic hydride or deuteride, said plurality of conductive microspheres in electrical communication with said first grid and electrically isolated from said second grid.

2. A cell as set forth in claim 1, wherein said electrolytic cell further comprises:

a plurality of non-conductive microspheres positioned within said housing adjacent said second grid;

a foraminous non-conductive mesh positioned within said housing between said conductive and said non-conductive microspheres to prevent said conductive microspheres from contacting said second grid.

3. A cell as set forth in claim 1, wherein:

said plurality of conductive microspheres having a total surface area in a ratio of at least about 5:1 with respect to an inner surface of a portion of said housing which is generally coextensive with said plurality of conductive microspheres.

4. A cell as set forth in claim 1, wherein:

said metallic surface is taken from the group consisting of palladium, nickel, lanthanum, praseodymium, cerium, titanium, zirconium, vanadium, tantalum, uranium, hafnium and thorium.

5. A cell as set forth in claim 1, further comprising:

a plurality of non-metallic spherical cross-linked polymer microbeads each having a sulfonated surface which has been ion exchanged with a lithium salt;

said plurality of non-metallic microbeads positioned between said second grid and said conductive microspheres;

said plurality of non-metallic microbeads forming a conductive salt bridge thereacross.

6. A system for producing useful excess heat by heating a liquid electrolyte comprising:

an electrolytic cell including a non-conductive housing and an inlet and an outlet;

a first conductive foraminous grid positioned within said housing adjacent to said inlet;

a second conductive foraminous grid positioned within said housing spaced from said first conductive grid and adjacent to said outlet;

a plurality of conductive microspheres each having an inert spherical taken from the group consisting of steel, silver, plastic and ceramic core completely covered with a uniform conductive metallic layer, said plurality of conductive microspheres in electrical communication with said first grid and electrically isolated from said second grid;

means for pumping said liquid electrolyte into said electrolytic cell through said inlet, said electrolyte having a conductive salt in solution with water;

means operably connected to said first and second grids for maintaining an electrical current flow between said first and second grids when said system is in operation and said electrolyte is within said electrolytic cell.

7. A system as set forth in claim 6, wherein said electrolytic cell further comprises:

a plurality of non-conductive microspheres positioned within said housing adjacent said second grid;

a foraminous non-conductive mesh positioned within said housing between said conductive and said non-conductive microspheres to prevent said conductive microspheres from contacting said second grid.

8. A system as set forth in claim 6, wherein:

said plurality of conductive microspheres having a total surface area in a ratio of at least about 5:1 with respect to an inner surface of a portion of said housing which is generally coextensive with said plurality of conductive microspheres.

9. A system as set forth in claim 6, wherein:

said metallic surface is taken from the group consisting of palladium, nickel, lanthanum, praseodymium, cerium, titanium, zirconium, vanadium, tantalum, uranium, hafnium and thorium.

10. A system as set forth in claim 6, further comprising:

a plurality of non-metallic microbeads each having a sulfonated surface which has been ion exchanged with a lithium salt;

said plurality of non-metallic microbeads positioned between said second grid and said conductive microspheres;

said plurality of non-metallic microbeads forming a conductive salt bridge thereacross.

11. An electrolytic cell for producing excess heating of a liquid electrolyte for use external to said cell comprising:

a non-conductive housing having an inlet and an outlet;

a first conductive foraminous grid positioned within said housing adjacent to said inlet;

a second conductive foraminous grid positioned within said housing spaced from said first conductive grid and adjacent to said outlet;

a plurality of conductive microspheres each having an inert spherical core completely covered with a uniformly thick outer conductive metallic layer formed over said inert core, said metallic layer is taken from the group consisting of palladium, lanthanum, praseodymium, cerium, titanium, zirconium, vanadium, tantalum, hafnium and thorium, said plurality of conductive microspheres in electrical communication with said first grid and electrically isolated from said second grid.

12. A system for producing useful excess heat by heating a liquid electrolyte comprising:

an electrolytic call including a non-conductive housing and an inlet and an outlet;

a first conductive foraminous grid positioned within said housing adjacent to said inlet;

a second conductive foraminous grid positioned within said housing spaced from said first conductive grid and adjacent to said outlet;

a plurality of conductive microspheres each having an inert spherical core completely covered with a uniform conductive metallic layer which is taken from the group consisting of palladium, lanthanum, praseodymium, cerium, titanium, zirconium, vanadium, tantalum, hafnium and thorium, said plurality of conductive microspheres in electrical communication with said first grid and electrically isolated from said second grid;

means for pumping said liquid electrolyte into said electrolytic call through said inlet, said electrolyte having a conductive salt in solution with water;

means operably connected to said first and second grids for maintaining an electrical current flow between said first and second grids when said system is in operation and said electrolyte is within said electrolytic cell.

13. A system for producing useful excess heat by heating a liquid electrolyte comprising:

an electrolytic cell including a non-conductive housing and an inlet and an outlet;

a first conductive foraminous grid positioned within said housing adjacent to said inlet;

a second conductive foraminous grid positioned within said housing spaced from said first conductive grid and adjacent to said outlet;

a plurality of conductive microspheres each having an inert spherical core completely covered with a uniform conductive metallic layer which is, during operation of said cell, being adapted to combine with hydrogen or an isotope of hydrogen to form a metallic hydride or deuteride, said plurality of conductive microspheres in electrical communication with said first grid and electrically isolated from said second grid;

means for pumping said liquid electrolyte into said electrolytic cell through said inlet, said electrolyte having a conductive salt in solution with water;

means operably connected to said first and second grids for maintaining an electrical current flow between said first and second grids when said system is in operation and said electrolyte is within said electrolytic cell;

a plurality of non-conductive microspheres positioned within said housing adjacent said second grid;

a foraminous non-conductive mesh positioned within said housing between said conductive and said non-conductive microspheres to prevent said conductive microspheres from contacting said second grid.

14. A system for producing useful excess heat by heating a liquid electrolyte comprising:

an electrolytic cell including a non-conductive housing and an inlet and an outlet;

a first conductive foraminous grid positioned within said housing adjacent to said inlet;

a second conductive foraminous grid positioned within said housing spaced from said first conductive grid and adjacent to said outlet;

a plurality of conductive microspheres each having an inert spherical core completely covered with a uniform conductive metallic layer which is, during operation of said cell, being adapted to combine with hydrogen or an isotope of hydrogen to form a metallic hydride or deuteride, said plurality of conductive microspheres in electrical communication with said first grid and electrically isolated from said second grid;

means for pumping said liquid electrolyte into said electrolytic cell through said inlet, said electrolyte having a conductive salt in solution with water;

means operably connected to said first and second grids for maintaining an electrical current flow between said first and second grids when said system is in operation and said electrolyte is within said electrolytic cell;

a plurality of non-metallic microbeads each having a sulfonated surface which has been ion exchanged with a lithium salt;

said plurality of non-metallic microbeads positioned between said second grid and said conductive microspheres;

said plurality of non-metallic microbeads forming a conductive salt bridge thereacross.

15. An electrolytic cell for producing excess heating of a liquid electrolyte for use external to said cell comprising:

a non-conductive housing having an inlet and an outlet;

a first conductive foraminous grid positioned within said housing adjacent to said inlet;

a second conductive foraminous grid positioned within said housing spaced from said first conductive grid and adjacent to said outlet;

a plurality of conductive microspheres each having an inert spherical core, said spherical core completely covered with a uniformly thick outer conductive metallic layer formed over said inert core, said metallic layer, during operation of said cell, being adapted to combine with hydrogen or an isotope of hydrogen to form a metallic hydride or deuteride, said spherical core being inert with respect to combining with hydrogen or an isotope of hydrogen to form a metallic hydride or deuteride, said plurality of conductive microspheres in electrical communication with said first grid and electrically isolated from said second grid;

a plurality of non-conductive microspheres positioned within said housing adjacent said second grid;

a foraminous non-conductive mesh positioned within said housing between said conductive and said non-conductive microspheres to prevent said conductive microspheres from contacting said second grid.

16. An electrolytic cell for producing excess heating of a liquid electrolyte for use external to said cell comprising:

a non-conductive housing having an inlet and an outlet;

a first conductive foraminous grid positioned within said housing adjacent to said inlet;

a second conductive foraminous grid positioned within said housing spaced from said first conductive grid and adjacent to said outlet;

a plurality of conductive microspheres each having an inert spherical core, said spherical core completely covered with a uniformly thick outer conductive metallic layer formed over said inert core, said metallic layer, during operation of said cell, being adapted to combine with hydrogen or an isotope of hydrogen to form a metallic hydride or deuteride, said spherical core being inert with respect to combining with hydrogen or an isotope of hydrogen to form a metallic hydride or deuteride, said plurality of conductive microspheres in electrical communication with said first grid and electrically isolated from said second grid;

a plurality of non-metallic spherical microbeads each having a sulfonated surface which has been ion exchanged with a lithium salt;

said plurality of non-metallic microbeads positioned between said second grid and said conductive microspheres;

said plurality of non-metallic microbeads forming a conductive salt bridge thereacross.

* * * * *